United States Patent [19]

Schilling

[11] 4,104,119
[45] Aug. 1, 1978

[54] EMERGENCY FEED SYSTEM FOR COOLING NUCLEAR REACTOR INSTALLATIONS

[75] Inventor: Rainer Schilling, Erlangen, Germany

[73] Assignee: Kraftwerk Union Aktiengesellschaft, Mülheim (Ruhr), Germany

[21] Appl. No.: 768,500

[22] Filed: Feb. 14, 1977

[30] Foreign Application Priority Data

Feb. 18, 1976 [DE] Fed. Rep. of Germany ....... 2606469

[51] Int. Cl.² .................................................. G21C 9/00
[52] U.S. Cl. .......................................... 176/38; 176/65
[58] Field of Search ..................... 176/37, 38, 60, 65, 176/87

[56] References Cited

FOREIGN PATENT DOCUMENTS 1,291,706  10/1972  United Kingdom ..................... 176/37

*Primary Examiner*—Samuel W. Engle
*Assistant Examiner*—Ralph Palo
*Attorney, Agent, or Firm*—Herbert L. Lerner

[57] ABSTRACT

Emergency feed system for cooling nuclear reactor installations having a vessel for containing deionate which is fed to a steam generator through an emergency feed pump having a suction line connected to the vessel includes a circulating line extending at one end thereof from the vessel and having connected therein a circulating pump and heat exchanger means for cooling components of the emergency feed system, valve means connected to the other end of the circulating line, and a pair of lines both extending from the valve means and connected, respectively, to the suction line of the emergency feed pump and to a drainage system.

4 Claims, 1 Drawing Figure

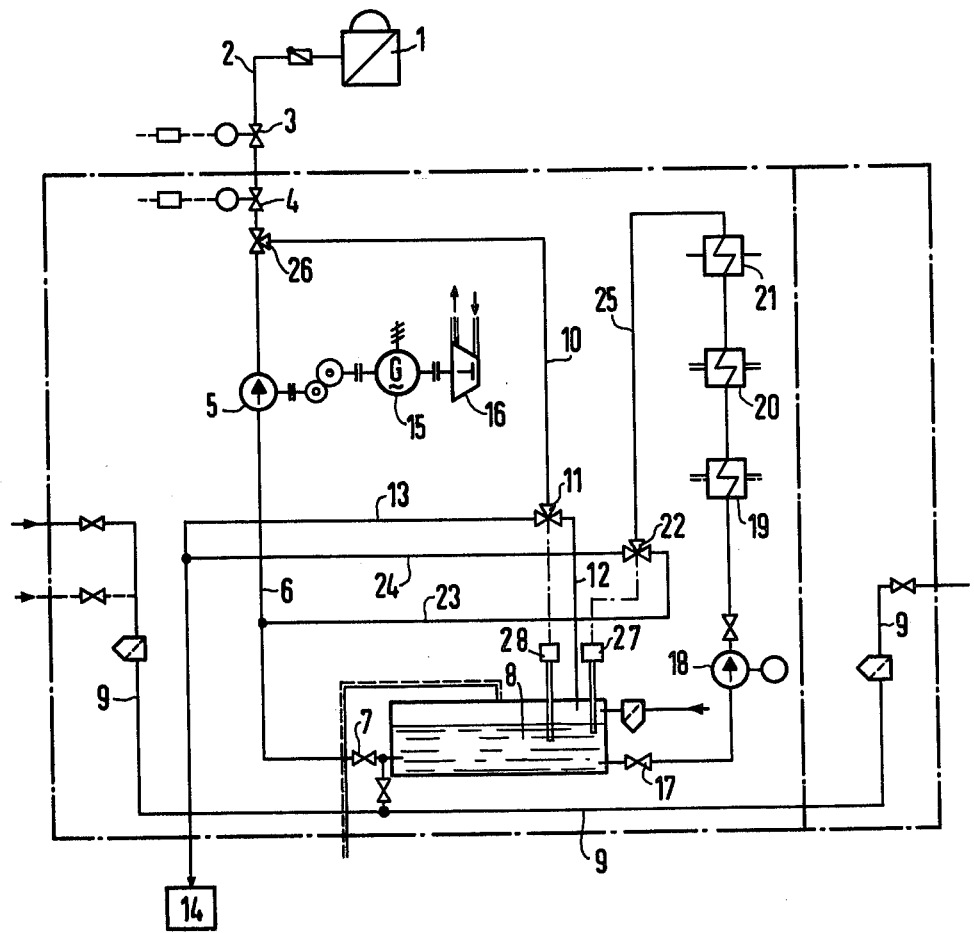

EMERGENCY FEED SYSTEM FOR COOLING NUCLEAR REACTOR INSTALLATIONS

The invention relates to an emergency feed system for cooling nuclear reactor installations.

In nuclear reactor installations, wherein steam for operating steam turbines are produced, assurance must be provided that, also when subjected to external actions or effects, such as an airplane crash, an explosion pressure wave and the like, for example, the heat of radioactivity which is produced after the nuclear reactor has been shut down can be removed reliably for a period of time without contact from the outside. Therefore, an emergency feed system is installed which is conventionally constructed of four partial systems separated from one another and providing 4×50% of the required cooling power. Assurance is provided by this redundancy or backup that, in the event of a defect in one of the partial systems while repair or maintenance work is being performed simultaneously in another partial system, adequate cooling of the reactor will nevertheless be assured.

The heretofore known emergency feed systems are essentially formed of a respective vessel filled with deionate (completely desalted feedwater), the respective vessel being connected through a suction line and through a diesel-driven emergency feed pump to the respective steam generator of the nuclear reactor installation.

In a situation wherein a mishap with external damage exists as a result of the effect of an applied force (for example, a break in a live steam line and failure of the current supply and maintenance), one must assume that in the first hours after this mishap no personnel will be availabe for introducing or instituting the emergency measures. The emergency feed system must consequently become operative automatically after such a mishap and must be able to maintain emergency operation for about ten hours. In addition to cooling the reactor core by feeding deionate into the secondary side of the steam generator and blowing off or releasing the developing steam through the roof, so-to-speak, it is necessary, in such a demanding situation, that various other auxiliary systems also be cooled adequately. For example, the emergency feed diesel set, the pump and transmission oil as well as the air in the rooms of the emergency feed building must be cooled.

It is accordingly an object of the invention to provide an emergency feed system for cooling nuclear reactor installations wherein, besides subsequently feeding the steam generator with deionate, these additional cooling objectives are attained in an economical and reliable manner.

With the foregoing and other objects in view, there is provided, in accordance with the invention, an emergency feed system for cooling nuclear reactor installations having a vessel for containing deionate which is fed to a steam generator through an emergency feed pump having a suction line connected to the vessel comprising a circulating line extending at one end thereof from the vessel and having connected therein a circulating pump and heat exchanger means for cooling components of the emergency feed system, valve means connected to the other end of the circulating line, and a pair of lines both extending from the valve means and connected, respectively, to the suction line of the emergency feed pump and to a drainage system.

In accordance with an additional feature of the invention, the emergency feed system includes means for controlling the valve means in accordance with the temperature of the deionate contained in the vessel so as to connect the circulating line through the valve means to the suction line of the emergency feed pump when the temperature of the deionate is below a given temperature, and to connect the circulating line through the valve means to the drainage system when the temperature of the deionate is at least at the given temperature.

In accordance with a further feature of the invention, the emergency feed pump has a pressure line connected to the steam generator, a return line is connected at one end thereof to the pressure line and at the other end thereof through a valve unit to an additional line extending to the vessel, and means are provided for returning to the vessel though the return line, the valve unit and the additional line, at least part of the deionate pumped by the emergency feed pump.

In accordance with a concomitant feature of the invention, the emergency feed system includes another line connected from the valve unit to a drainage system, and means for controlling the valve unit in accordance with the temperature of the deionate contained in the vessel so that when the temperature of the deionate reaches a given maximal temperature, the valve unit blocks flow of deionate from the return line to the additional line extending from the valve unit to the vessel and opens flow of deionate from the return line to the drainage system.

Although the invention is illustrated and described herein as embodied in emergency feed system for cooling nuclear reactor installations, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of the single FIGURE of the drawing which is a schematic view of an emergency feeding system for a steam generator of a nuclear reactor installation.

Referring now to the drawing, there is shown a steam generator 1 of a nuclear reactor that is provided with an emergency feed line 2 which is connected through valves 3 and 4 to the pressure side of an emergency feed pump 5. A suction line 6 extends from the emergency feed pump 5 through a valve 7 to a vessel 8, which is filled with deionate i.e. completely desalted, feedwater for the steam generator 1. The vessel 8 is filled through filling lines 9 independently of the water level. A return line 10 branches off from the emergency feed line 2 between the emergency feed pump 5 and the valve 4, and through a three-way valve 11, is connectible either to a line 12 or a line 13, depending upon the respective setting of the three-way valve 11. The line 12 returns to the vessel 8, and the line 13 leads to the outside to a drainage system.

The emergency feed pump 5 is directly coupled through a generator 15 to a diesel plant 16.

A circulating pump 18 is connected to the vessel 8 through a valve 17, and through three heat exchangers 19 to 21, which are serially connected to one another on the coolant-water side, to another three-way valve 22 through which a connection can be effected to a line 23 or a line 24. The line 23 terminates in the suction line 6, and the line 24 leads to the drainage system 14.

In the event the electric current supply (regular requirement as well as emergency supply) were to fail, the emergency feed diesel installation 16 would be started up and drive the generator 15 and the emergency feed pump 5. Simultaneously, the circulating pump 18 would be started up to feed coolant water to the heat exchangers 19 to 21. The three-way valve 11 would connect the return line 10 to the line 12, while the valves 3 and 4 would remain closed. During the operational mode, the emergency feed pump 5 functions with the minimal delivery thereof necessary for operating, and pumps this minimal delivery through a valve 26 into the line 10 and from there through the three-way valve 11 into the line 12 to the vessel 8. The three-way valve 22 connects the circulating line 25 to the line 23 as long as a predetermined permissible maximal temperature valve is not yet attained in the vessel 8.

As shown diagrammatically in the figure, the temperature of the deionate in the vessel 8 is monitored by a conventional monitoring device 27, which includes a temperature sensor immersed in the deionate contained in the vessel 8 for determining the temperature thereof. As long as the temperature of the deionate is below the predetermined permissible maximum temperature valve, flow of deionate through the three-way valve 22 and from the circulating line 25 to the line 23 and back to the vessel 8 is maintained. When the sensor of the monitoring device 27 senses that the temperature of the deionate contained in the vessel 8 has reached the aforementioned predetermined permissible maximum temperature, for example, electrically signals a suitable relay for actuating an electromagnet armature or motor for setting the three-way valve 22 so as to block flow from the circulating lines 25 to the line 23 and consequently to the vessel 8, and instead to institute flow from the circulating line 25 through the line 13 to the drainage system 14.

In the event an emergency situation requires the steam generator 1 to be fed, the valves 3 and 4 are also opened and the valve 11 remains in the aforementioned setting as long as the quantity of deionate which must be fed into the steam generator 1 is greater than the minimal quantity to be delivered by the emergency feed pump 5. In this operational phase, the quantity subsequently fed to the steam generator 1 can be controlled independently of the quantity of deionate flowing in the circulating line 25. Nevertheless, because the line 23 terminates in the suction line 6, no deionate heated in the heat exchangers 19 to 21 is fed back into the vessel 8 for a very long time, because the heated deionate is pumped by the emergency feed pump 5 completely into the steam generator 1.

If the steam generator 1 should require, at a later time, less deionate than is pumped through the heat exchangers 19 to 21, the complement to this quantity i.e. the excess thereof is returned through the valve 26 into the line 10 and through the valve 11 into the line 12 and back into the vessel 8.

If a permissible maximal temperature value is attained in the vessel 8, the three-way valve 11 is automatically shifted in response thereto through any suitable conventional means into the selling wherein the heated quantity of deionate that is produced can discharge through the line 13 into the drainage system 14. As shown diagrammatically in the figure, the temperature is monitored by another conventional monitoring device 28, similar to the monitoring device 27 which includes a temperature sensor immersed in the deionate contained in the vessel 8 for determining the temperature thereof. If the temperature of the deionate reaches the aforementioned permissible maximal temperature value, the temperature sensor, for example, electrically signals a suitable relay for activating an electromagnet armature or motor for setting the three-way valve 11 to block flow of deionate from the return line 10 to the line 12 and then to the vessel 8 and for opening flow of deionate from the return line 10 to the line 13 and then to the drainage system 14. Instead of employing two monitoring devices 27 and 28, it is, of course, readily apparent that only one thereof can be used for controlling both of the valves 11 and 22.

The vessel 8 with the deionate supply is employed simultaneously in the invention of the instant application, for subsequent or auxiliary feeding of the steam generator 1 and as the heat sink for the heat exchangers 19 to 21. In the hereinaforedescribed embodiment of the invention, the heat exchanger 19 serves, for example, as circulating air cooler, the heat exchanger 20 as transmission-oil and pump-oil cooler, and the heat exchanger 21 as cooler for the emergency diesel plant 16. With a circulatory system wherein deionate heated in the heat exchangers 19 to 21 is preferably employed for subsequent or auxiliary feeding of the steam generator 1, the possibility is additionally realized of supplying the heat exchangers 19 to 21 with cooling medium, without any material increase in the size of the vessel 8 if it were designed only for subsequent or auxiliary feeding of the steam generator 1. Costly structures for an additional cooling-water storage, which must be protected especially against external influences or effects, are therefore no longer necessary.

There are claimed:

1. Emergency feed system for cooling nuclear reactor installations having a vessel for containing deionate which is fed to a steam generator through an emergency feed pump having a suction line connected to the vessel comprising a circulating line extending at one end thereof from the vessel and having connected therein a circulating pump and heat exchanger means for cooling components of the emergency feed system, valve means connected to the other end of said circulating line, and a pair of lines both extending from said valve means and connected, respectively, to the suction line of the emergency feed pump and to a drainage system.

2. Emergency feed system according to claim 1 including means for controlling said valve means in accordance with the temperature of the deionate contained in the vessel so as to connect said circulating line through said valve means to the suction line of the emergency feed pump when the temperature of the deionate is below a given temperature, and to connect said circulating line through said valve means to said drainage system when the temperature of the deionate is at least at said given temperature.

3. Emergency feed system according to claim 1 wherein the emergency feed pump has a pressure line connected to the steam generator, and including a return line connected at one end thereof to the pressure line and at the other end thereof through a valve unit to an additional line extending to the vessel, and means for returning to the vessel through said return line, said valve unit and said additional line, at least part of the deionate pumped by the emergency feed pump.

4. Emergency feed system according to claim 3 including another line connected from said valve unit to a drainage system, and means for controlling said valve unit in accordance with the temperature of the deionate contained in the vessel so that when the temperature of the deionate reaches a given maximal temperature, said valve unit blocks flow of deionate from said return line to said additional line extending from said valve unit to the vessel and opens flow of deionate from said return line to said drainage system.

* * * * *